(12) United States Patent
Kellner et al.

(10) Patent No.: US 12,337,771 B2
(45) Date of Patent: Jun. 24, 2025

(54) MOTOR VEHICLE AND METHOD FOR MOUNTING A HOUSING ON A SHELL OF A MOTOR VEHICLE

(71) Applicant: Dr. Ing. h.c. F. Porsche Aktiengesellschaft, Stuttgart (DE)

(72) Inventors: Philipp Kellner, Renningen (DE); Sascha Mostofi, Stuttgart (DE); Christopher Volkmer, Niefern-Öschelbronn (DE); Adrian Starczewski, Korntal-Münchingen (DE); Immanuel Vogel, Steinheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 368 days.

(21) Appl. No.: 17/972,643

(22) Filed: Oct. 25, 2022

(65) Prior Publication Data

US 2023/0129402 A1   Apr. 27, 2023

(30) Foreign Application Priority Data

Oct. 26, 2021 (DE) .................. 10 2021 127 846.5

(51) Int. Cl.
*B60R 16/02* (2006.01)
*B62D 21/11* (2006.01)
*B62D 65/02* (2006.01)

(52) U.S. Cl.
CPC .............. *B60R 16/02* (2013.01); *B62D 21/11* (2013.01); *B62D 65/024* (2013.01)

(58) Field of Classification Search
CPC ......... B60R 16/02; B62D 21/11; B62D 21/02; B62D 21/03; B62D 21/12; B62D 65/024;
(Continued)

(56) References Cited

U.S. PATENT DOCUMENTS

| 2002/0100622 A1* | 8/2002 | Shimizu | ............ H01M 8/04089 180/291 |
| 2003/0085579 A1* | 5/2003 | Seksaria | ................ B62D 65/04 293/133 |

(Continued)

FOREIGN PATENT DOCUMENTS

| CN | 102806945 A * | 12/2012 | ............... B60K 1/00 |
| CN | 113135231 A | 7/2021 | |

(Continued)

OTHER PUBLICATIONS

Shigematsu (JP 2011020626 A), machine translation (Year: 2011).*

*Primary Examiner* — Amy R Weisberg
*Assistant Examiner* — Wenwei Zhuo
(74) *Attorney, Agent, or Firm* — Buchanan Ingersoll & Rooney PC

(57) ABSTRACT

A motor vehicle having a shell including a first side facing a roadway and a second side opposite to the first side, and a housing in which at least one electronic component is arranged. The housing is fastened to the shell via a mounting member. The mounting member is releasably fastened to the shell and the housing is releasably fastened to the mounting member such that, in a mounting operation of the housing, the mounting member and the housing are mountable on the shell via the first side of the shell, and the housing is removable via the second side of the shell during a removal operation of the housing.

11 Claims, 3 Drawing Sheets

(58) Field of Classification Search
CPC ........ B62D 65/10; B62D 65/12; B62D 65/04;
B62D 25/082; B62D 25/085; B62D
25/08; B62D 25/20; B62D 25/2018;
B62D 27/06; B62D 27/065; B60K 6/405
USPC ............ 296/193.09, 193.03, 193.04, 203.02
See application file for complete search history.

(56) References Cited

U.S. PATENT DOCUMENTS

| | | | |
|---|---|---|---|
| 2004/0011513 | A1 | 1/2004 | Haneda et al. |
| 2007/0051549 | A1* | 3/2007 | Fukuda ................. B62D 21/155 180/312 |
| 2010/0102595 | A1* | 4/2010 | Baumbarger .......... B62D 21/11 296/193.01 |
| 2012/0247863 | A1* | 10/2012 | Lamoine .................. B60K 1/00 29/592.1 |
| 2015/0360548 | A1* | 12/2015 | Merkel .................... B60K 1/00 180/291 |
| 2018/0065457 | A1* | 3/2018 | Akai ........................ B60K 1/04 |
| 2018/0354559 | A1* | 12/2018 | Nakauchi ............. B62D 25/082 |
| 2019/0300063 | A1* | 10/2019 | Sasaki .................... B62D 1/195 |
| 2020/0031399 | A1* | 1/2020 | Matsuda ............ B62D 25/2036 |
| 2020/0079200 | A1* | 3/2020 | Suzuki .................... B60K 1/00 |
| 2021/0061206 | A1 | 3/2021 | Eklund |
| 2021/0078414 | A1* | 3/2021 | Ajisaka .................. B60L 50/71 |
| 2021/0221210 | A1* | 7/2021 | Ryuno .................... B60L 50/66 |

FOREIGN PATENT DOCUMENTS

| | | |
|---|---|---|
| DE | 602004012983 T2 | 5/2009 |
| JP | 2011020626 A * | 2/2011 |

* cited by examiner

MOTOR VEHICLE AND METHOD FOR MOUNTING A HOUSING ON A SHELL OF A MOTOR VEHICLE

CROSS REFERENCE TO RELATED APPLICATION

This application claims priority to German Patent Application No. 10 2021 127 846.5, filed Oct. 26, 2021, the content of such application being incorporated by reference herein in its entirety.

FIELD OF THE INVENTION

The invention relates to a motor vehicle having a shell comprising a first side facing a roadway and a second side opposite to the first side, and a housing in which at least one electronic component is arranged, wherein the housing is fastened to the shell via a mounting member. The housing can also be the housing of the electronic component.

BACKGROUND OF THE INVENTION

Such mounting members for arranging different components are generally known from the prior art, wherein the mounting member is usually fastened to the shell during an assembly of the motor vehicle, and subsequently the housing in which a component is arranged is mounted on that of the mounting member. Typically, the housing is inserted from above, i.e. via a side facing away from a roadway, into a region bounded by the shell and fastened to the shell. In another case, it can be advantageous to insert the housing into the shell via a side facing the roadway and to fasten it to the shell. Such a mounting of the housing is particularly advantageous in electric vehicles. The housing with the component arranged therein, the components of the powertrain, the components of the chassis, and a battery, in particular an underbody battery, are mounted on the shell from below, i.e. via the side of the shell facing the roadway. It is disadvantageous here that the housing is obscured by the other components such that a later removal of the housing is no longer possible. A removal of the housing would only be possible by way of a removal of the other components. Such a removal of the housing or the component arranged in the housing must necessarily and at best be possible easily in the event of a fault, in particular in the maintenance of the motor vehicle.

SUMMARY OF THE INVENTION

Described herein is a motor vehicle in which a replaceable component can be mounted and removed in a simple and cost-efficient manner.

Because the mounting member is releasably fastened to the shell and the housing is releasably fastened to the mounting member in such a way that, during a mounting operation of the housing, the mounting member and the housing can be mounted on the shell via the first side of the shell and, during a housing removal operation, the housing can be removed via the second side of the shell, the housing can be easily removed in a final assembled state of the motor vehicle, and the electronic component can be easily replaced in the event of a failure. For example, the electronic component can be a component of a battery management system of an electric vehicle. On the other hand, the electronic component can be any other component present in a motor vehicle, for example, any control device.

In the mounting operation, for example, the housing is initially releasably pre-mounted on the mounting member, wherein the releasable connection can be any known releasable type of joining. Then, the mounting member is inserted together with the housing via the side of the shell facing the roadway into a space bounded by the shell, and the mounting member is fastened to the shell. The housing is thus fastened to the shell via the mounting member.

To remove the housing, the connecting means of the joining connection between the mounting member and the housing are arranged such that, in the final assembled state of the motor vehicle, they are also easily accessible from the second side facing away from the roadway, i.e. they are easily releasable with a tool and are not obscured by other components.

The housing can thus be easily first mounted from below, i.e. via the underbody of the motor vehicle. In the event of a failure of a component arranged in the housing, the housing can be easily removed from above, the defective component can be replaced by a replacement component, and finally the housing can be reinserted from above into the space bounded by the shell and fastened to the mounting member via the connecting means.

Preferably, the housing is arranged in a front region of the motor vehicle.

Preferably, the mounting member is screwed onto the shell, which allows the mounting member to be fastened to the shell in a simple and reliable manner.

In a preferred configuration, the housing is screwed onto the mounting member. The housing can thus be releasably mounted on the mounting member easily, wherein the screw connections can be easily released upon removal and the housing can be guided upwards out of the space bounded by the shell.

Preferably, the shell comprises two side members extending in the travel direction, wherein the mounting member extends in the transverse direction of the vehicle from a first side member to a second side member and is fastened to the side members. By fastening the mounting member to both side members, the mounting member can be reliably fastened to the shell, on the one hand, and can stiffen and strengthen the shell, on the other hand.

In a preferred configuration, the side members each have a fastening projection on a side facing the other side member, wherein the mounting member is fastened to the fastening projections. This allows the mounting member to be easily connected to the side members. The mounting member is preferably connected to the side members via a plurality of screw elements, wherein the direction of joining of the screw elements is aligned in the travel direction. A particularly reliable connection between the mounting member and the side members can thus be made in the vertical direction of the vehicle and in the travel direction, i.e. in the longitudinal direction of the vehicle.

In a preferred configuration, the mounting member comprises at its respective end faces a member projection extending in the travel direction, wherein the member projections member themselves on a cross member of the shell. The mounting member can thus be reliably secured against a twisting about its longitudinal axis. In addition, such a fastening at different locations and at different components of the shell results in a stiffening of the shell.

Preferably, the housing comprises a fastening tab extending in the vertical direction of the vehicle, wherein the housing abuts in the vertical direction of the vehicle against an abutment surface of the mounting member aligned in the vertical direction of the vehicle and abuts with the fastening tab in the travel direction against an abutment surface of the mounting member aligned in the travel direction and is fastened to the mounting member. This allows a reliable support of the housing in the travel direction and in the vertical direction of the vehicle. In addition, in this way, the housing can be easily and reliably mounted on the mounting member, wherein sufficient space is available for the tool for screwing the housing onto the mounting member.

Preferably, the shell comprises two suspension strut receptacles, wherein the housing is releasably fastened to a side facing away from the mounting member with an additional mounting member, wherein the additional mounting member is releasably fastenable at the end side to the suspension strut receptacles. With the additional mounting member, the housing can be fastened against a release on the one hand and the shell can be stiffened on the other hand.

Furthermore, the problem is solved by a method for mounting a housing, in which at least one electronic component is arranged, on a shell of a motor vehicle, wherein the housing and the mounting member are mounted on the shell via a first side facing a roadway, and the housing is removed via a second side opposite to the first side. With respect to the advantages, reference is made to the preceding paragraphs.

BRIEF DESCRIPTION OF THE DRAWING FIGURES

An exemplary embodiment of the invention will now be explained in further detail with reference to the drawings.

DETAILED DESCRIPTION OF THE INVENTION

Figure 1:
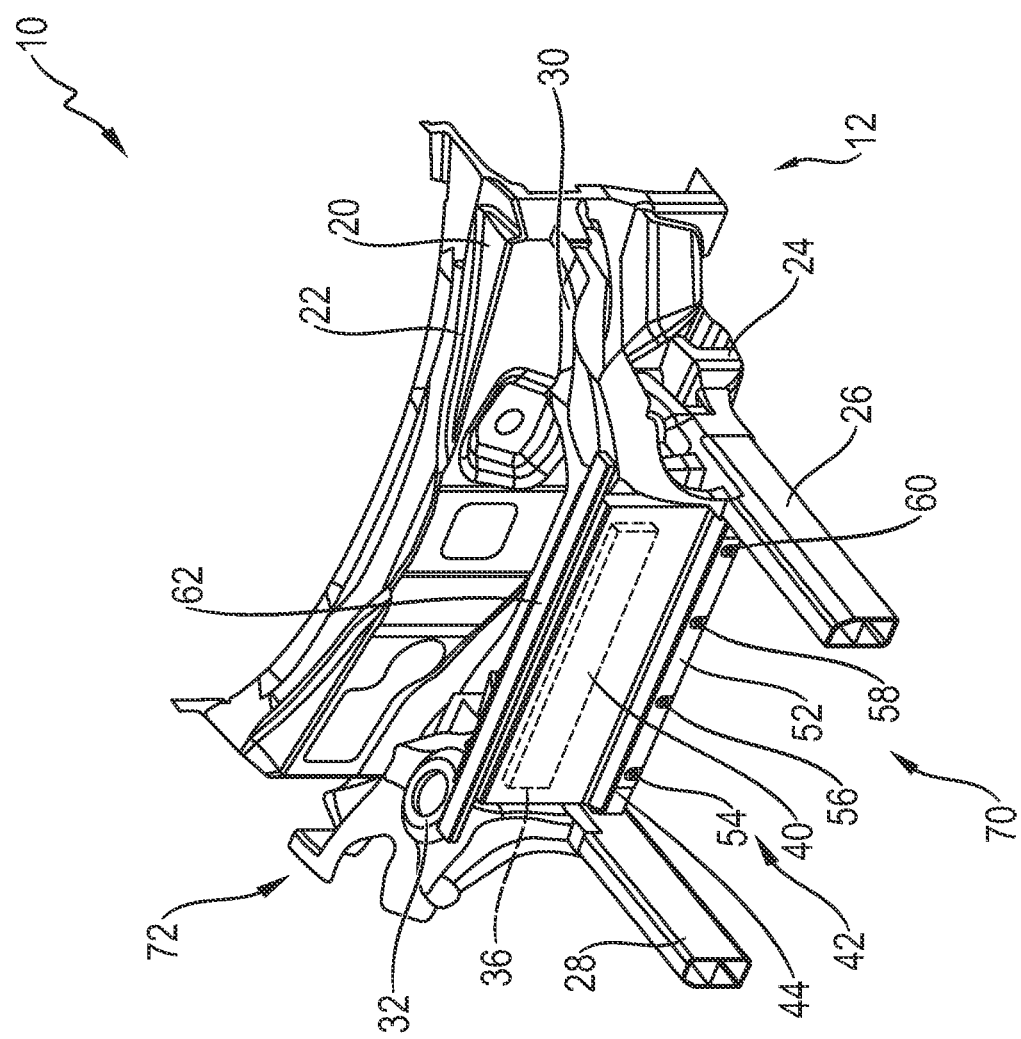
FIG. 1 shows a front end of a motor vehicle in the assembled state.

FIG. 1 discloses a front end 12 of a motor vehicle 10, wherein the motor vehicle 10 is an electric vehicle and substantially comprises an electric drive unit and a traction battery. The traction battery and the electric drive unit are not shown in the figures.

The front end 12 comprises a partition 22, which is arranged between a passenger compartment and a power compartment and separates the passenger compartment from the power compartment. The front end 12 further comprises two side members 26, 28 arranged parallel to one another and extending in the travel direction and a cross member 24 extending in the transverse direction of the vehicle. The cross member 24 is fixedly connected to the side members 26, 28. In the node points between the cross member 24 and the side members 26, 28, respectively, a suspension strut receptacle 30, 32 is arranged, which is fixedly connected to the cross member 24 and the respective side member 26, 28. The side members 26, 28, the cross member 24, and the suspension strut receptacles 30, 32 are components of a shell 20 of the motor vehicle 10.

The motor vehicle 10 further comprises a housing 40, which is fastened to the shell 20 via a mounting member 42. The mounting member 42 is made of a tube 44 having a rectangular cross section. Further, the housing is fastened to the shell 20 via an additional mounting member 62. The mounting member 42 is fastened to the cross member 24 at the side members 26, 28 on the end side and via member projections 46 extending in the travel direction. The additional mounting member 62 is fastened to one of the two suspension strut receptacles 30, 32 on each end side. In the vertical direction of the vehicle between the mounting member 42 and the additional mounting member 62, the housing 40 is arranged, wherein the housing 40 is fastened, in particular screwed, to the mounting member 42 with one side facing a roadway and with the opposite side to the additional mounting member 62.

An electronic component 36 is arranged in the housing 40, for example a control unit, and in particular in the case of an electric vehicle a battery management system. In the event of a failure of the electronic component 36, the electronic component 36 and thus the housing 40 must be easily removable.

Figure 2:
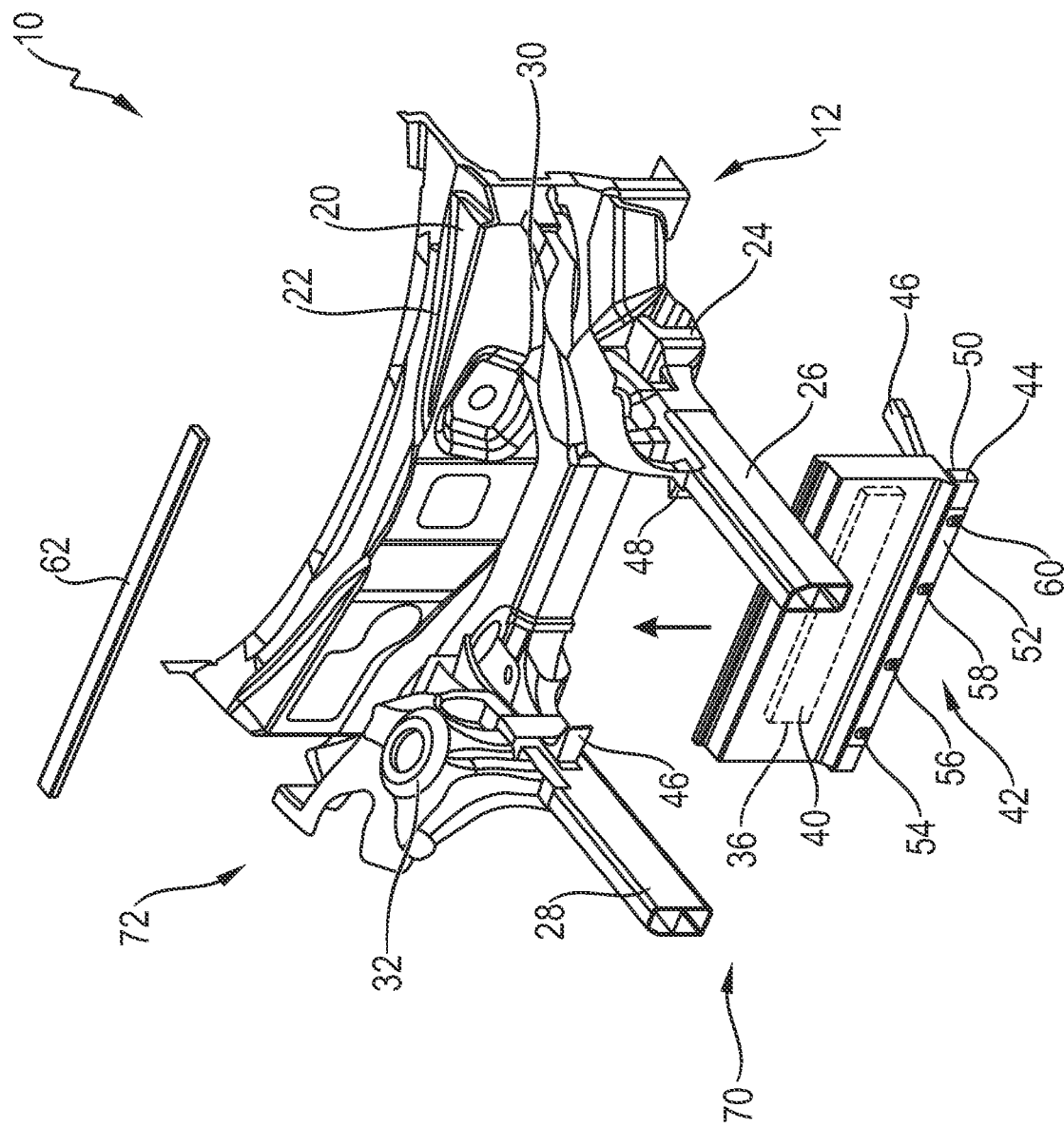
FIG. 2 shows the front end from FIG. 1 during a mounting operation.
Figure 3:
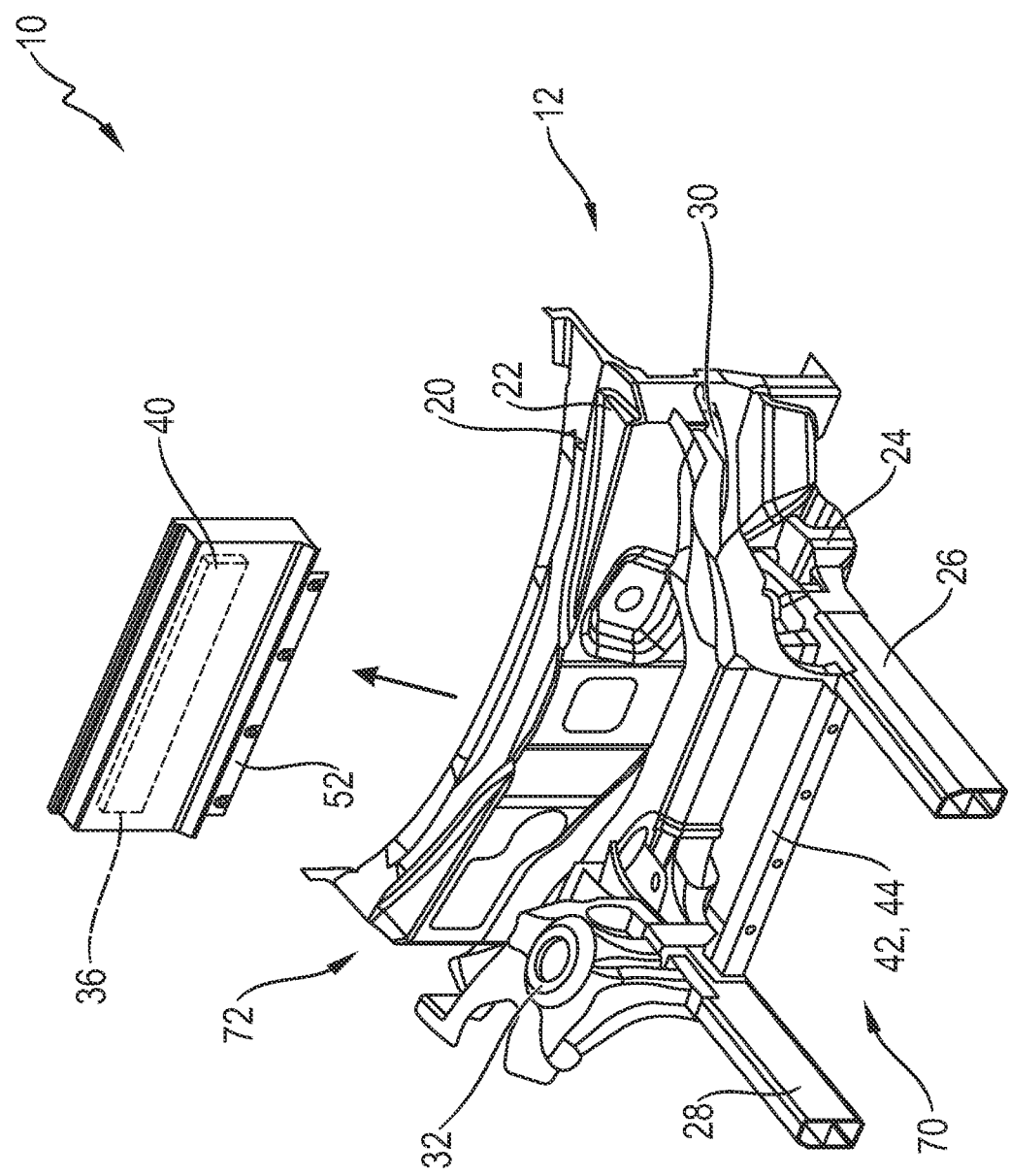
FIG. 3 shows the front end from FIGS. 1 and 2 during a removal operation.

FIG. 2 shows a mounting operation of the housing 40 on the shell 20 and FIG. 3 shows a removal operation of the housing 40.

During the mounting operation, the housing 40 is pre-mounted on the mounting member 42. The housing 40 includes a fastening tab 52 that abuts against the mounting member 42 in the travel direction and is fastened to the mounting member 42 via a plurality of screw elements 54, 56, 58, 60. The housing 40 continues to abut against an abutment surface 50 in the vertical direction of the vehicle on the mounting member 42 and thereby members the mounting member 42 in the vertical direction of the vehicle. In a mounting step subsequent to the pre-mounting of the housing 40 and the mounting member 42, the mounting member 42 is mounted together with the housing 40 on the shell 20, wherein the mounting member 42 is screwed onto the side members 26, 28 and the cross member 24. For mounting the mounting member 42 to the side members 26, 28, each side member 26, 28 comprises a fastening projection 46, 48 on the sides facing each other, wherein the mounting member 42 is placed into abutment in the travel direction on the fastening projections 46, 48 and screwed to the fastening projections 46, 48. Finally, the additional mounting member 62 is screwed to the suspension strut receptacles 30, 32, and the housing 40 is screwed to the additional mounting member 62.

The housing 40 is thus reliably fastened to the shell 20 on both sides, namely on the one hand by the mounting member 42 and on the other hand by the additional mounting member 62. The mounting member 42 and the additional mounting member 62 further stiffen the shell 20.

In a removal operation, the housing 40 is simply released from the additional mounting member 62, the additional mounting member 62 is removed, and the screw elements 54, 56, 58, 60 are released, thereby releasing the connection of the housing 40 from the mounting member 42. The housing 40 can then be guided out of a space bounded by the shell 20. The mounting member 42 remains in its mounted state. All removal steps are carried out from above, i.e. via the second side 72.

According to aspects of the invention, the mounting member 42 and the housing 40 are thus inserted into the space of the shell 20 via a first side 70 of the shell 20 facing the roadway, i.e. from below, and mounted on the shell 20, and, during a removal operation, the housing 40 is removed via a second side 72 opposite to the first side 70, i.e. from above. In this way, the housing 40 can be mounted and removed easily.

Structural embodiments other than the described embodiments, which fall within the scope of protection of the main claim, are possible as well. For example, the mounting member 42 or the shell 20 can be configured differently.

What is claimed is:

1. A motor vehicle comprising:
a shell including a first side that is positionable to face a roadway and a second side opposite to the first side, wherein the shell comprises two suspension strut receptacles and two side members extending in a travel direction,
a housing in which at least one electronic component is arranged,
a mounting member that fastens the housing to the shell, and
an additional mounting member having (i) a central portion that is fastened to the housing and (ii) end portions that are fastened to the shell at respective suspension strut receptacles,
wherein the mounting member is releasably mounted on the shell and the housing is releasably fastened to the mounting member such that, in a mounting operation of the housing, the mounting member and the housing are mountable on the shell via the first side of the shell, and the housing is removable via the second side of the shell during a removal operation of the housing by removing the additional mounting member,
wherein the mounting member extends in a transverse direction of the motor vehicle between the two side members and is fastened to the side members,
wherein the mounting member and the additional mounting member are positioned at opposite sides of the housing, and
wherein the housing is sandwiched between the two side members in the transverse direction, and wherein the housing is sandwiched between the mounting member and the additional mounting member in a vertical direction of the motor vehicle.

2. The motor vehicle according to claim 1, wherein the mounting member is fastened onto the shell.

3. The motor vehicle according to claim 1, wherein the housing is fastened onto the mounting member.

4. The motor vehicle according to claim 1, wherein the side members each have a fastening projection on a side facing the other side member, wherein the mounting member is fastened to the fastening projections.

5. The motor vehicle according to claim 1, wherein the mounting member comprises a member projection extending in the travel direction, wherein the member projection is attached to a cross member of the shell.

6. The motor vehicle according to claim 1, wherein the housing comprises a fastening tab extending in a vertical direction of the vehicle, wherein the housing abuts in a vertical direction of the vehicle against an abutment surface of the mounting member aligned in the vertical direction of the vehicle and abuts with the fastening tab in the travel direction against an abutment surface of the mounting member aligned in the travel direction and is fastened to the mounting member.

7. The motor vehicle according to claim 1, wherein the side members each have a fastening projection on a side facing the other side member, wherein the mounting member is fastened to the fastening projections,
wherein the mounting member comprises a member projection extending in the travel direction, wherein the member projection is attached to a cross member of the shell, and
wherein the fastening projections are positioned forward of the cross member as viewed in the travel direction.

8. The motor vehicle according to claim 1, wherein the at least one electronic component forms part of a battery management system of an electric vehicle.

9. The motor vehicle according to claim 1, wherein the housing is mounted above the mounting member that is fastened to the shell, such that the mounting member prevents removal of the housing via the first side of the shell.

10. The motor vehicle according to claim 1, wherein the housing includes a fastening tab that abuts and is fastened to a front facing side of the mounting member as viewed in the travel direction.

11. The motor vehicle according to claim 10, further comprising fasteners for mounting the fastening tab to the front facing side of the mounting member, wherein the fasteners are insertable and removable in the travel direction.

* * * * *